United States Patent [19]
Roth et al.

[11] Patent Number: 5,875,294
[45] Date of Patent: Feb. 23, 1999

[54] METHOD AND SYSTEM FOR HALTING PROCESSOR EXECUTION IN RESPONSE TO AN ENUMERATED OCCURRENCE OF A SELECTED COMBINATION OF INTERNAL STATES

[75] Inventors: Charles P. Roth, Austin; Charles G. Wright, Round Rock, both of Tex.

[73] Assignee: International Business Machines Corporation, Armonk, N.Y.

[21] Appl. No.: 497,242

[22] Filed: Jun. 30, 1995

[51] Int. Cl.$^6$ ........................................... G06F 11/30
[52] U.S. Cl. ........................ 395/183.15; 345/184.01; 345/183.06; 345/838; 345/800.32
[58] Field of Search .................... 395/800, 704, 395/800.32, 183.15, 184.01, 183.06, 838

[56] References Cited

U.S. PATENT DOCUMENTS

| | | |
|---|---|---|
| 3,866,184 | 2/1975 | Buhrke et al. . |
| 4,231,106 | 10/1980 | Heap et al. . |
| 4,438,490 | 3/1984 | Wilder, Jr. . |
| 4,590,550 | 5/1986 | Eilert et al. . |
| 4,598,364 | 7/1986 | Gum et al. . |
| 4,821,178 | 4/1989 | Levin et al. . |
| 4,905,171 | 2/1990 | Kiel et al. . |
| 5,379,390 | 1/1995 | Searing et al. . |

OTHER PUBLICATIONS

Harden et al., "A Performance Monitor for the MSPARC Multicomputer," IEEE, 1992, pp. 724–729.
Franklin et al., "POWER2: Performance Measurement and Analysis of TPC–C," IEEE, 1994, pp. 399–404.
Fineman et al., "Selective Monitoring Using Performance Metric Predicata," IEEE, 1992, pp. 162–165.
Krumme et al., "Integrated Debugging and Performance Monitoring for Parallel Programs," IEEE, 1991, pp. 317–318.
Lampp, Jr. et al., "Specification and Identification of Events for Debugging and Performance Monitoring of Distributed Multiprocessor Systems," IEEE, 1990, pp. 476–483.
IBM Technical Disclosure Bulletin, vol. 37, No. 04B, Apr. 1994, pp. 295–301.
IBM Technical Disclosure Bulletin, vol. 37, No. 09, Sep. 1994, pp. 465–467.
IBM Technical Disclosure Bulletin, vol. 24, No. 3, Aug. 1981, pp. 1416–1419.
IBM Technical Disclosure Bulletin, vol. 20, No. 8, Jan. 1978, pp. 3229–3230.

*Primary Examiner*—Alyssa H. Bowler
*Assistant Examiner*—John Follansbee
*Attorney, Agent, or Firm*—Casimer K. Salys; Brian F. Russell; Andrew J. Dillon

[57] ABSTRACT

A method and system within a data processing system are disclosed for halting execution of instructions by a processor in response to an enumerated occurrence of a selected combination of internal states within the processor. The processor includes a number of state machines and a means for monitoring the states of the number of state machines. According to the present invention, a selected combination of states of a subset of the state machines is specified. An enumerated occurrence of the selected combination of states of the subset of the state machines is then detected. In response to the enumerated occurrence of the selected combination of states, execution of instructions by the processor is halted such that states of the number of state machines within the processor remain substantially unchanged following the enumerated occurrence of the selected combination of states. In a first embodiment of the present invention, the selected combination of states is specified as a combination of states corresponding to an access to a specified address within an associated memory. According to a second embodiment of the present invention, the selected combination of states is specified as a selected sequence of states of a subset of the number of state machines.

24 Claims, 4 Drawing Sheets

METHOD AND SYSTEM FOR HALTING PROCESSOR EXECUTION IN RESPONSE TO AN ENUMERATED OCCURRENCE OF A SELECTED COMBINATION OF INTERNAL STATES

BACKGROUND OF THE INVENTION

1. Technical Field

The present invention relates in general to a method and system for data processing and in particular to an improved method and system for halting the execution of a processor. Still more particularly, the present invention relates to a method and system for halting the execution of instructions by a processor in response to an enumerated occurrence of a selected combination of internal processor states.

2. Description of the Related Art

Some state-of-the-art processors, such as the PowerPC™ line of processors available from IBM Microelectronics, provide a service processor known as a common on-chip processor (COP) to enable testing of the processor hardware. The COP supports a scan testing debugging methodology by providing a JTAG (IEEE Standard 1149.1) interface, a scan control, and a processor control to start, reset, and stop execution of instructions by the processor.

As will be appreciated by those skilled in the art, processor hardware can be analyzed as a number of interconnected latches and combinatorial logic circuits. While the processor is under test, the COP allows a programmer to select breakpoints at which the processor is stopped and its state (i.e., the state of each of the latches within the processor) is accessed. For example, processor control options can be selected to enable breakpoints to be set after each instruction within testing software, after a predetermined number of processor cycles have elapsed, or upon access by the processor to a particular address within memory.

Typically, the COP supports two methods for stopping execution of instructions by the processor. A hardstop automatically halts processor execution at the specified breakpoint regardless of the state of the processor. Because of on-going activities within the system in which the processor is integrated, a processor cannot continue operating subsequent to a hardstop without undergoing a reset. In contrast to a hardstop, a softstop allows certain processor functions, such as bus transfers and memory management table walks to complete before processor execution is halted. Following a softstop, processor execution can be resumed, thereby enabling a programmer to determine the effect of particular processor states at later points within the execution stream.

Although a COP provides a convenient and powerful low-level debugging tool for testing processor hardware in situ, the COP does not give a user complete freedom to specify breakpoints at which to test the processor. For example, a preferred method for tracking a problem is to set a breakpoint at the address of a particular instruction. However, because an error may not occur each time the breakpoint address is accessed, debugging the processor hardware utilizing the COP can be inefficient since the processor is halted each time the breakpoint address is accessed. Furthermore, because of the looping structure of typical software, the breakpoint address can be referenced hundreds or thousands of times before the iteration at which the processor error occurs is reached.

Consequently, it would be desirable to provide an improved method and system for halting execution of a processor in response to a predetermined iteration of a selected event. In particular, it would be desirable to provide an improved method and system which enable the execution of a processor to be halted upon a selected access to a predetermined address.

SUMMARY OF THE INVENTION

It is therefore one object of the present invention to provide an improved method and system for data processing.

It is another object of the present invention to provide an improved method and system for halting the execution of a processor.

It is yet another object of the present invention to provide an improved method and system for halting the execution of instructions by a processor in response to an enumerated occurrence of a selected combination of internal processor states.

The foregoing objects are achieved as is now described. A method and system within a data processing system are disclosed for halting execution of instructions by a processor in response to an enumerated occurrence of a selected combination of internal states within the processor. The processor includes a number of state machines and a means for monitoring the states of the number of state machines. According to the present invention, a selected combination of states of a subset of the state machines is specified. An enumerated occurrence of the selected combination of states of the subset of the state machines is then detected. In response to the enumerated occurrence of the selected combination of states, execution of instructions by the processor is halted such that states of the number of state machines within the processor remain substantially unchanged following the enumerated occurrence of the selected combination of states. In a first embodiment of the present invention, the selected combination of states is specified as a combination of states corresponding to an access to a specified address within an associated memory. According to a second embodiment of the present invention, the selected combination of states is specified as a selected sequence of states of a subset of the number of state machines.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an illustrative embodiment of one of the processors shown in FIG. 2; and.

DETAILED DESCRIPTION OF PREFERRED EMBODIMENT

Figure 1:
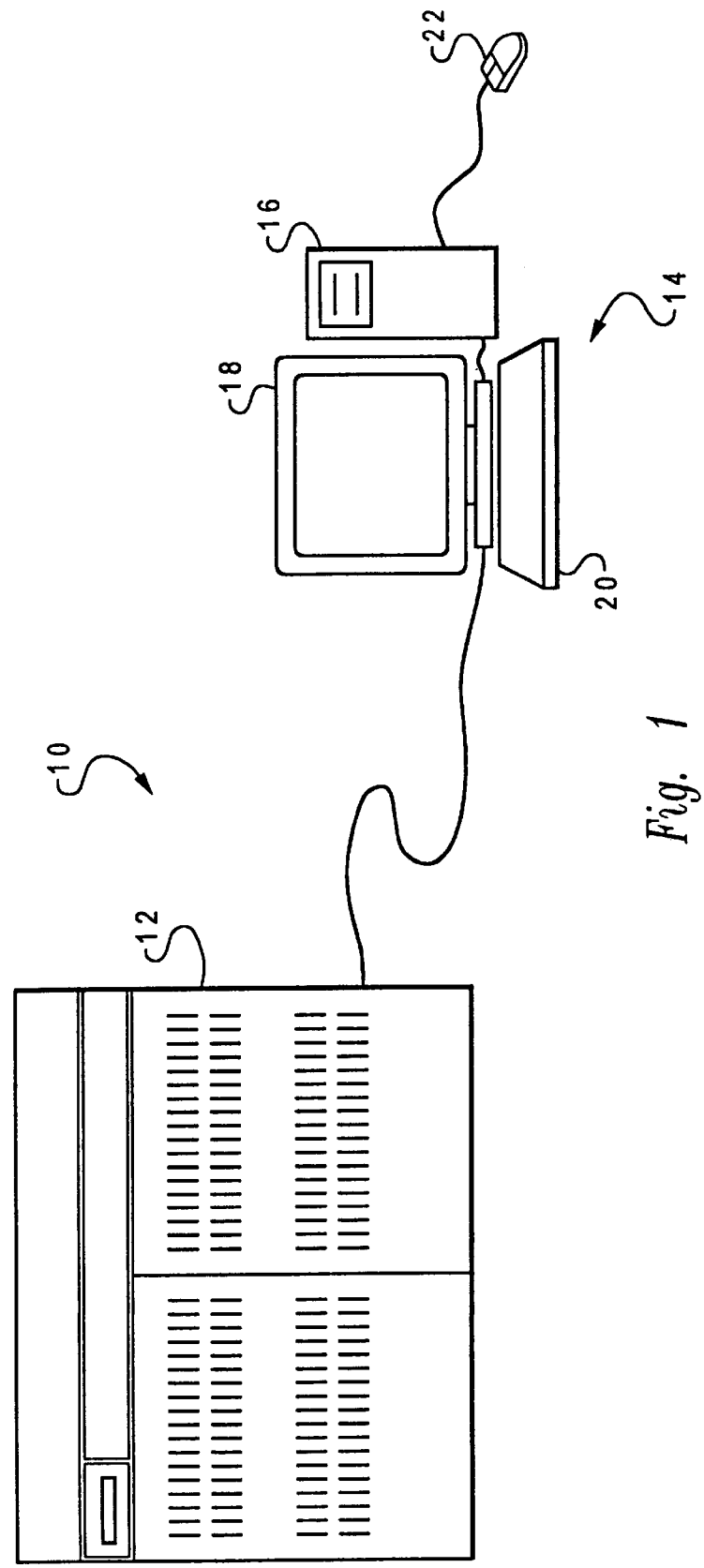
FIG. 1 illustrates a block diagram of a data processing system which employs the method and system of the present invention.

With reference now to the figures and in particular with reference to FIG. 1, there is illustrated a preferred embodiment of a data processing system that includes a processor which employs the method and system of the present invention. As illustrated, data processing system 10 comprises system unit 12 and one or more local nodes 14, which include personal computer 16, display 18, keyboard 20, and mouse 22. As is well-known to those skilled in the art, a user inputs data to personal computer 16 utilizing keyboard 20, mouse 22, or other suitable input device. The user may then process the data locally utilizing personal computer 16, or transmit the data from personal computer 16 to system unit 12 or another node 14 utilizing well-known networking techniques. It is advantageous for a user to send tasks to system unit 12 for execution since system unit 12 can execute tasks in a relatively short period of time compared to node 14. System unit 12 and personal computer 16 output data to a user via display device 18.

Figure 2:
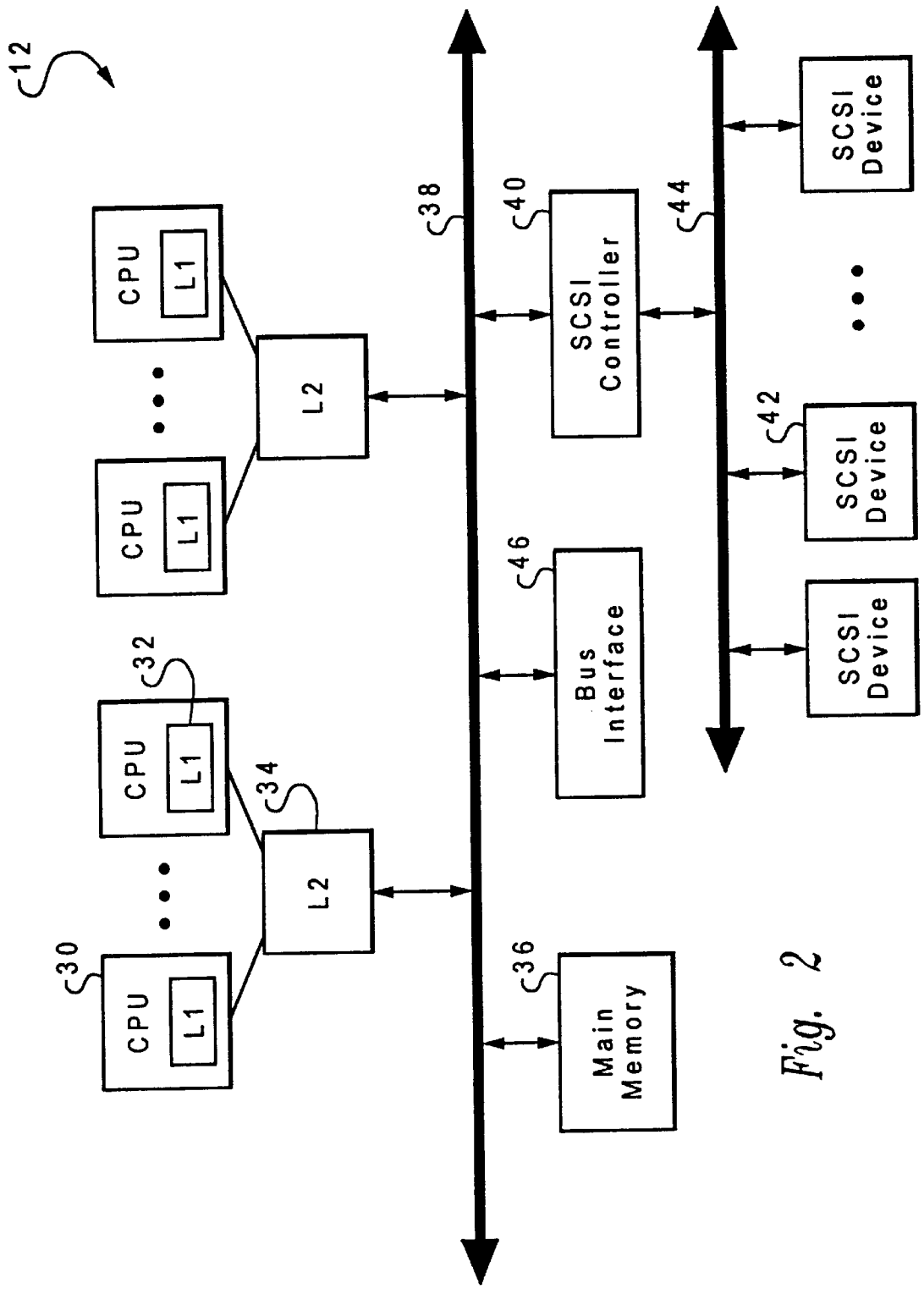
FIG. 2 depicts a block diagram of the system unit of the data processing system illustrated in FIG. 1.

Referring now to FIG. 2, there is depicted a block diagram of system unit 12, which comprises a multitasking multi-processor computer, such as the IBM RISC System/6000. System unit 12 includes one or more CPUs 30, which are each capable of concurrently executing multiple instructions during each cycle. Each CPU 30 has an on-board level one (L1) cache 32 and an associated level two (L2) cache 34 from which CPU 30 accesses data and instructions. If data or instructions requested by a CPU 30 are not resident within L1 cache 32 or L2 cache 34 associated with CPU 30, CPU 30 accesses the requested data or instructions from main memory 36 or secondary storage (not illustrated) via system bus 38.

In addition, system unit 12 includes bus interface 44 through which multiple nodes 14 can interface to system resources available within system unit 12. System unit 12 also includes SCSI controller 40 which enables a number of SCSI devices 42, such as direct access storage devices (DASD), to be attached to system unit 12 via SCSI controller 40 and peripheral bus 44. As will be appreciated by those skilled in the art, system unit 12 includes additional hardware coupled to system bus 38 that is not necessary for an understanding of the present invention and is accordingly omitted for simplicity.

Figure 3:
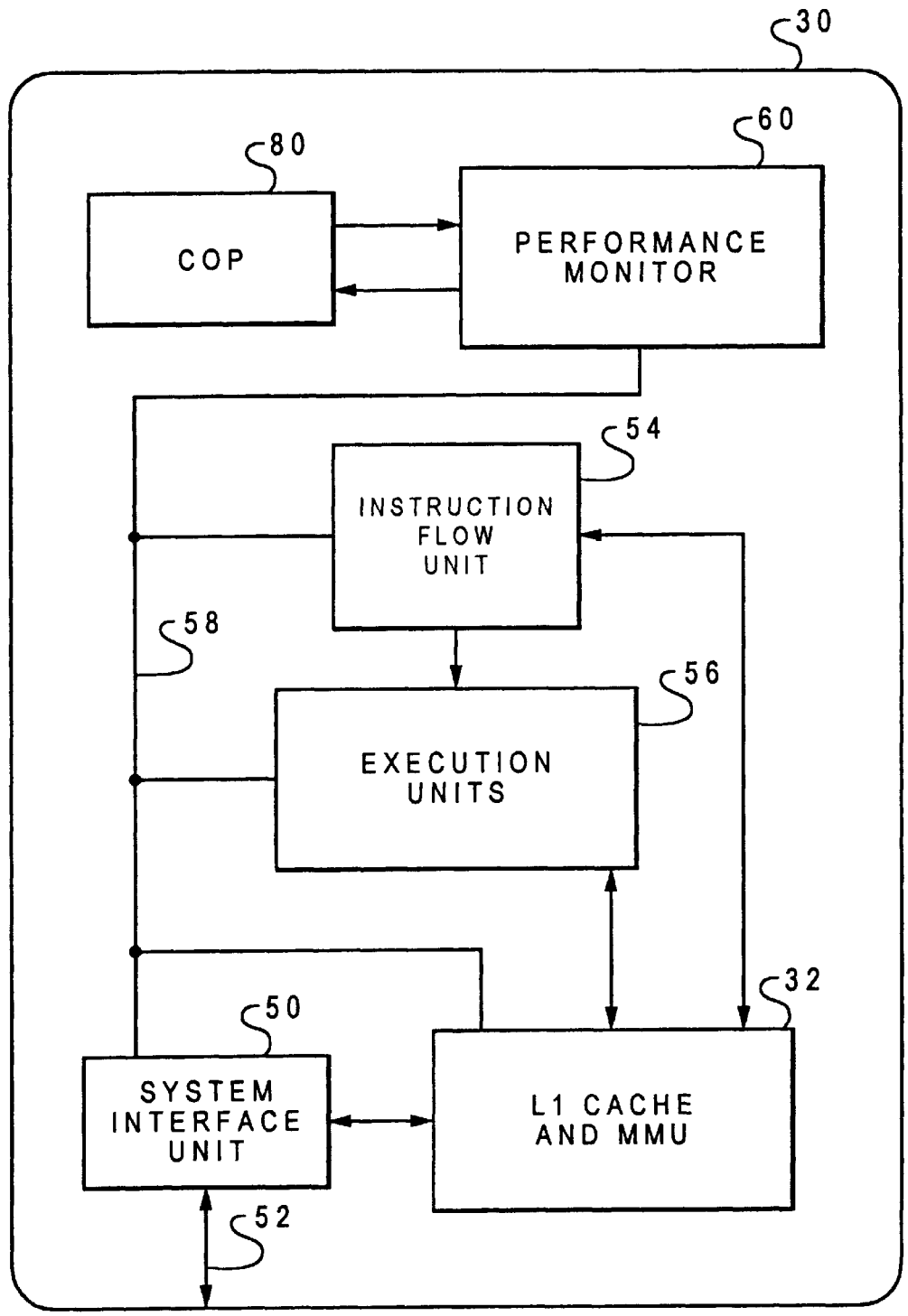

With reference now to FIG. 3, there is depicted a more detailed block diagram of a CPU 30. As illustrated, CPU 30 includes L1 cache 32, system interface unit 50, instruction flow unit 54, and execution units 56. System interface unit (SIU) 50 is connected to an L2 cache 34 via processor bus 52 and controls the transfer of information between CPU 30 and the remainder of system unit 12. SIU 50 is also connected to L1 cache 32, which comprises a small, relatively fast portion of memory that stores data and instructions retrieved from lower levels of memory. Data and instructions stored within L1 cache 32 are retrieved as required by instruction flow unit 54, which then dispatches instructions to selected ones of execution units 56 for execution. In a preferred embodiment of the present invention, execution units 56 comprise one or more fixed-point execution units, load/store execution units, and floating-point execution units. As will be appreciated by those skilled in the art, the provision of multiple execution units 56 enables CPU 30 to execute multiple instructions during each processor cycle.

According to the present invention, CPU 30 also includes common on-chip processor (COP) 80 and performance monitor 60. As described above, COP 80 comprises a service processor within CPU 30 that provides facilities to perform low-level hardware debugging on CPU 30. COP 80 includes a standard JTAG interface that enables a user to scan test the processor state of CPU 30. In addition, CPU 30 includes performance monitor 60, which monitors activity within each functional unit of CPU 30 via interconnect 58.

Figure 4:
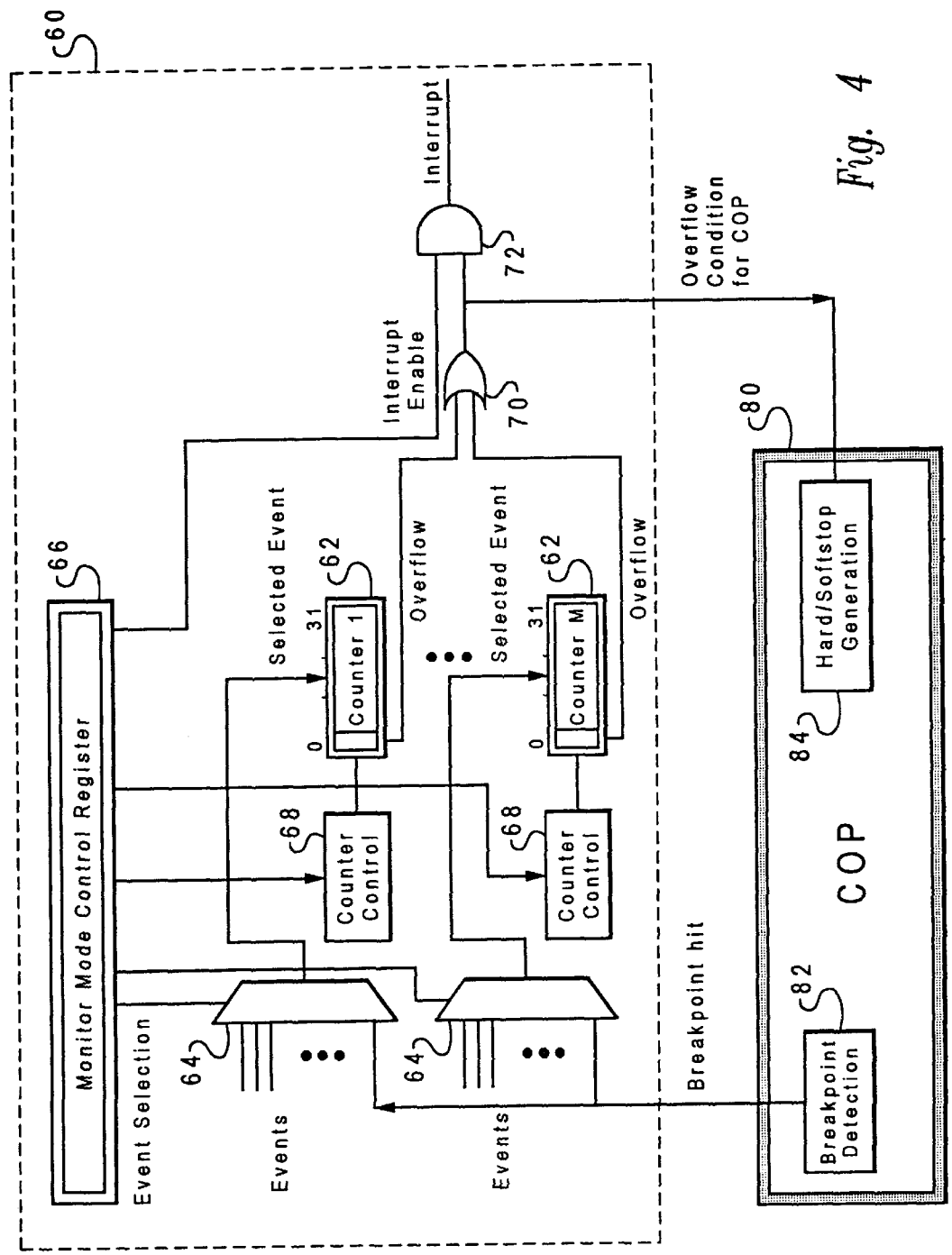
FIG. 4 illustrates a preferred embodiment of the interconnection between a performance monitor and a common on-chip processor (COP) within one of the processors depicted in FIG. 2.

Referring now to FIG. 4, there is depicted a more detailed block diagram of COP 80 and performance monitor 60. Performance monitor 60 monitors events generated by instruction flow unit 54, execution units 56, L1 cache 32, and system interface unit 50 via interconnect 58. Each event (or state) generated by these functional units is received as an input to each of multiplexers 64 as depicted in FIG. 4. Based upon bit settings within monitor mode control register (MMCR) 66, a particular event is selected for each of multiplexers 64 from among the input events. Under the control of MMCR 66 and counter control 68, each counter 62 is incremented in response to each occurrence of the event selected for that counter by MMCR 66. As will be apparent to those skilled in the art, the events monitored within CPU 30 are implementation specific and may include, for example, the number of processor cycles, the number of instructions dispatched or completed, the number of cache misses, or any other internal state within CPU 30.

Each of counters 62 is said to overflow when the most significant bit (bit 0) changes state from a 0 to a 1. As indicated by OR gate 70 and AND gate 72, when an overflow of a counter 62 occurs, an interrupt is generated if interrupts are enabled by the setting of MMCR 66. In response to the generation of an interrupt, CPU 30 executes the specific exception handler associated with the interrupt. Because each of counters 62 and MMCR 66 are software readable and writable, a programmer can set performance monitor 60 to overflow and generate an interrupt upon a selected iteration of a particular event.

In addition to determining the events counted by counters 62, the setting of MMCR 66 also determines when counters 62 are advanced. Counting options include starting a counter 62 immediately after MMCR 66 is programmed, starting a counter 62 in response to an overflow of another counter 62, stopping a counter 62 when an overflow of that counter 62 occurs, stopping a counter 62 when an overflow of any counter 62 occurs, and continuously counting regardless of counter overflows.

As will be appreciated by those skilled in the art, performance monitor 60 can be utilized in a variety of ways to increase software and hardware efficiency. For example, by monitoring memory hierarchy behavior, a programmer can design more efficient software and task scheduling algorithms. Furthermore, performance monitor 60 can be employed by processor designers to study the behavior of CPU 30 in a variety of software environments. Because performance monitor 60 can count events (i.e., internal processor states) that are inaccessible from system bus 38, data provided by performance monitor 60 often is more useful to hardware designers than benchmark test data or processor traces. Finally, performance monitor 60 can be utilized by system designers to debug systems which incorporate CPU 30.

According to a first aspect of the present invention, performance monitor 60 is selectively coupled to hard/softstop generation unit 84 within COP 80. Thus, a programmer can choose to hardstop or softstop CPU 30 in response to an overflow of one of counters 62. Thus, any of the events or combination of events monitored by performance monitor 60 can be utilized to generate a hardstop or softstop at which the processor state of CPU 30 is scanned.

According to a second aspect of the present invention, breakpoint detection unit 82 within COP 80 is coupled to each of multiplexers 64 as an event source. Thus, if MMCR 66 is set appropriately, each detection of a breakpoint by breakpoint detection unit 82 can be counted as an event by one or more or counters 62 within performance monitor 60. Utilizing this feature, performance monitor 60 can be programmed such that a counter 62 overflows upon the $n^{th}$ occurrence of a breakpoint. Since typical software employs a looping structure and a breakpoint address may be referenced many times, the present invention represents a great advance over prior art systems which required that COP 80 generate a hardstop or softstop each time,the breakpoint address was referenced. In addition, the capability of generating a hardstop or softstop in response to a predetermined access to a specified breakpoint address enhances the efficiency of debugging in cases where a processor flaw is known to occur only after an $n^{th}$ access to the breakpoint address.

The present invention is particularly useful when debugging a program employing the modular programming paradigm. For example, a programmer may desire to set a breakpoint at an instruction within a subroutine at the $n^{th}$ access to that subroutine. To utilize the present invention, the programmer first sets breakpoint detection unit 82 to generate an event signal each time the subroutine is accessed. Then, the programmer sets MMCR 66 to select the event signal generated by breakpoint detection unit 82 as an event counted by a counter 62. In addition, MMCR 66 is set such that a second counter 62 begins counting instructions when the first counter 62 overflows and overflows itself when the count reaches the offset between the beginning of the subroutine and the selected instruction. Utilizing this method, the programmer can halt CPU 30 at the desired breakpoint without having to count thousands or millions of instructions. As will be appreciated by those skilled in the art, many other combinations of events monitored by performance monitor 60 and breakpoints detected by COP 80 can be utilized to trigger a hardstop or softstop of CPU 30.

As has been described, the present invention provides an improved method and system for halting the execution of a processor in response to the occurrence of a predetermined iteration of a selected event, a combination of events, or a sequence of events. The present invention not only provides a programmer with a nearly limitless combination of processor states that may be utilized to trigger a hardstop or softstop, but also simplifies the definition of triggering events. Furthermore, the present invention requires little additional hardware in processors which provide performance monitoring and COP facilities.

What is claimed is:

1. A method for halting execution of instructions by a processor in response to an enumerated occurrence of a selected combination of internal states, wherein said processor is a single integrated circuit including a plurality of hardware state machines and means for monitoring states of said plurality of hardware state machines, said method comprising:

specifying a selected combination of states of a subset of said plurality of hardware state machines within said processor, wherein at least one state within said selected combination of states is not detectable from a system bus;

detecting, utilizing said means, within said processor, for monitoring states of said plurality of hardware state machines, an enumerated occurrence of said selected combination of states of said subset of said plurality of hardware state machines; and in response to detection of said enumerated occurrence of said selected combination of states, halting execution of instructions by said processor such that states of said plurality of hardware state machines within said processor remain substantially unchanged following said enumerated occurrence of said selected combination of states.

2. The method for halting execution of instructions by a processor of claim 1, said method further comprising:

scanning said plurality of hardware state machines to determine a state of said processor.

3. The method for halting execution of instructions by a processor of claim 2, said method further comprising:

thereafter, resuming execution of instructions by said processor.

4. The method for halting execution of instructions by a processor of claim 3, wherein states of said plurality of hardware state machines remain unchanged following said enumerated occurrence of said selected combination of states, said method further comprising:

prior to said step of resuming execution of instructions by said processor, resetting said processor.

5. The method for halting execution of instructions by a processor of claim 1, said processor having an associated memory, wherein said step of specifying a selected combination of states of a subset of said plurality of hardware state machines comprises specifying a selected combination of states corresponding to an access to a particular address within said associated memory.

6. The method for halting execution of instructions by a processor of claim 1, wherein said step of specifying a selected combination of states of a subset of said plurality of hardware state machines comprises specifying a selected sequence of states of a subset of said plurality of hardware state machines.

7. The method of claim 1, wherein said step of detecting an enumerated occurrence comprises the step of detecting a specified occurrence that is subsequent to a first occurrence of said selected combination of states.

8. An apparatus for halting execution of instructions by a processor in response to an enumerated occurrence of a selected combination of internal states, said processor including a plurality of hardware state machines, said apparatus comprising:

means for monitoring states of said plurality of hardware state machines within said processor, wherein said processor is a single integrated circuit;

means for specifying a selected combination of states of a subset of said plurality of hardware state machines, wherein at least one state within said selected combination of states is not detectable from a system bus;

means for detecting an enumerated occurrence of said selected combination of states of said subset of said plurality of hardware state machines; and means, responsive to detection of said enumerated occurrence of said selected combination of states, for halting execution of instructions by said processor such that states of said plurality of hardware state machines within said processor remain substantially unchanged following said enumerated occurrence of said selected combination of states.

9. The apparatus for halting execution of instructions by a processor of claim 8, said apparatus further comprising:

means for scanning said plurality of hardware state machines to determine a state of said processor.

10. The apparatus for halting execution of instructions by a processor of claim 9, said apparatus further comprising:

means for thereafter resuming execution of instructions by said processor.

11. The apparatus for halting execution of instructions by a processor of claim 10, said apparatus further comprising:

means for resetting said processor prior to resuming execution of instructions by said processor in response to halting execution of instructions by said processor such that states of said plurality of hardware state machines remain unchanged following said enumerated occurrence of said selected combination of states.

12. The apparatus for halting execution of instructions by a processor of claim 8, said processor having an associated memory, wherein said means for specifying a selected combination of states of a subset of said plurality of hardware state machines comprises means for specifying a selected combination of states corresponding to an access to a particular address within said associated memory.

13. The apparatus for halting execution of instructions by a processor of claim 8, wherein said means for specifying a selected combination of states of a subset of said plurality of hardware state machines comprises means for specifying a selected sequence of states of a subset of said plurality of hardware state machines.

14. The apparatus for halting execution of instructions by a processor of claim 8, wherein said means for monitoring states of said plurality of hardware state machines comprises a performance monitor.

15. The apparatus for halting execution of instructions by a processor of claim 8, wherein said means for halting execution of instructions by said processor comprises a common on-chip processor (COP).

16. The apparatus of claim 8, wherein said means for detecting an enumerated occurrence comprises means for detecting a specified occurrence that is subsequent to a first occurrence of said selected combination of states.

17. A single integrated-circuit processor, comprising:

a substrate;

a plurality of hardware state machines formed in said substrate, said plurality of hardware state machines including at least one execution unit for executing instructions;

means, formed within said substrate, for specifying a selected combination of states of a subset of said plurality of hardware state machines;

a performance monitor, formed within said substrate, for monitoring states of said plurality of hardware state machines, said performance monitor including means for detecting an enumerated occurrence of said selected combination of states of said subset of said plurality of hardware state machines, wherein at least one state within said selected combination of states is not detectable from a system bus; and means formed within said substrate, responsive to detection of said enumerated occurrence of said selected combination of states, for halting execution of instructions by said at least one execution unit such that states of said plurality of hardware state machines within said processor remain substantially unchanged following said enumerated occurrence of said selected combination of states.

18. The processor of claim 17, and further comprising:

means for scanning said plurality of hardware state machines to determine a state of said processor.

19. The processor of claim 18, and further comprising:

means for thereafter resuming execution of instructions by said at least one execution unit.

20. The processor of claim 19, and further comprising:

means for resetting said processor prior to resuming execution of instructions by said at least one execution unit in response to halting execution of instructions by said processor such that states of said plurality of hardware state machines remain unchanged following said enumerated occurrence of said selected combination of states.

21. The processor of claim 17, said processor having an internal memory, wherein said means for specifying a selected combination of states of a subset of said plurality of hardware state machines comprises means for specifying a selected combination of states corresponding to an access to a particular address within said internal memory.

22. The processor of claim 17, wherein said means for specifying a selected combination of states of a subset of said plurality of hardware state machines comprises means for specifying a selected sequence of states of a subset of said plurality of hardware state machines.

23. The processor of claim 17, wherein said means for specifying a selected combination of states of a subset of said plurality of hardware state machines comprises means for specifying at least one state that is only detectable internal to said processor.

24. The processor of claim 17, wherein said means for detecting an enumerated occurrence comprises means for detecting a specified occurrence that is subsequent to a first occurrence of said selected combination of states.

\* \* \* \* \*